(12) United States Patent
Clue

(10) Patent No.: US 8,770,186 B2
(45) Date of Patent: Jul. 8, 2014

(54) APPARATUS FOR HARNESSING SOLAR ENERGY

(76) Inventor: Vladimir I. Clue, Cambridge, MA (US)

(*) Notice: Subject to any disclaimer, the term of this patent is extended or adjusted under 35 U.S.C. 154(b) by 1206 days.

(21) Appl. No.: 12/655,229

(22) Filed: Dec. 28, 2009

(65) Prior Publication Data

US 2011/0155123 A1 Jun. 30, 2011

(51) Int. Cl.
*F24J 2/04* (2006.01)
(52) U.S. Cl.
USPC ............ 126/640; 126/439; 126/440; 126/684; 126/432; 126/424; 60/641; 60/517
(58) Field of Classification Search
USPC ............ 126/640, 440, 438, 442, 425; 60/641, 60/650, 508, 516
See application file for complete search history.

(56) References Cited

U.S. PATENT DOCUMENTS

| | | | | |
|---|---|---|---|---|
| 4,018,212 A | * | 4/1977 | Hein et al. | 126/681 |
| 4,280,482 A | * | 7/1981 | Nilsson, Sr. | 126/618 |
| 4,286,581 A | * | 9/1981 | Atkinson, Jr. | 126/585 |
| 4,397,152 A | * | 8/1983 | Smith | 60/641.15 |
| 4,815,443 A | * | 3/1989 | Vrolyk et al. | 126/697 |
| 5,524,381 A | * | 6/1996 | Chahroudi | 47/17 |
| 5,658,061 A | * | 8/1997 | Miller | 353/62 |
| 5,809,784 A | * | 9/1998 | Kreuter | 60/650 |
| 6,899,097 B1 | * | 5/2005 | Mecham | 126/591 |
| 2005/0103615 A1 | * | 5/2005 | Ritchey | 203/10 |
| 2009/0277441 A1 | * | 11/2009 | Jensen | 126/643 |

* cited by examiner

*Primary Examiner* — Steven B McAllister
*Assistant Examiner* — Nikhil Mashruwala
(74) *Attorney, Agent, or Firm* — Lambert & Associates; Gary E. Lambert; David J. Connaughton, Jr.

(57) ABSTRACT

An apparatus for harnessing solar energy that generates heat from solar radiation, which can be used in various applications. The apparatus for harnessing solar energy comprises a telescope reflector that projects a collimated beam towards a heat accumulator, wherein heat may be generated and used or stored for later use.

9 Claims, 7 Drawing Sheets

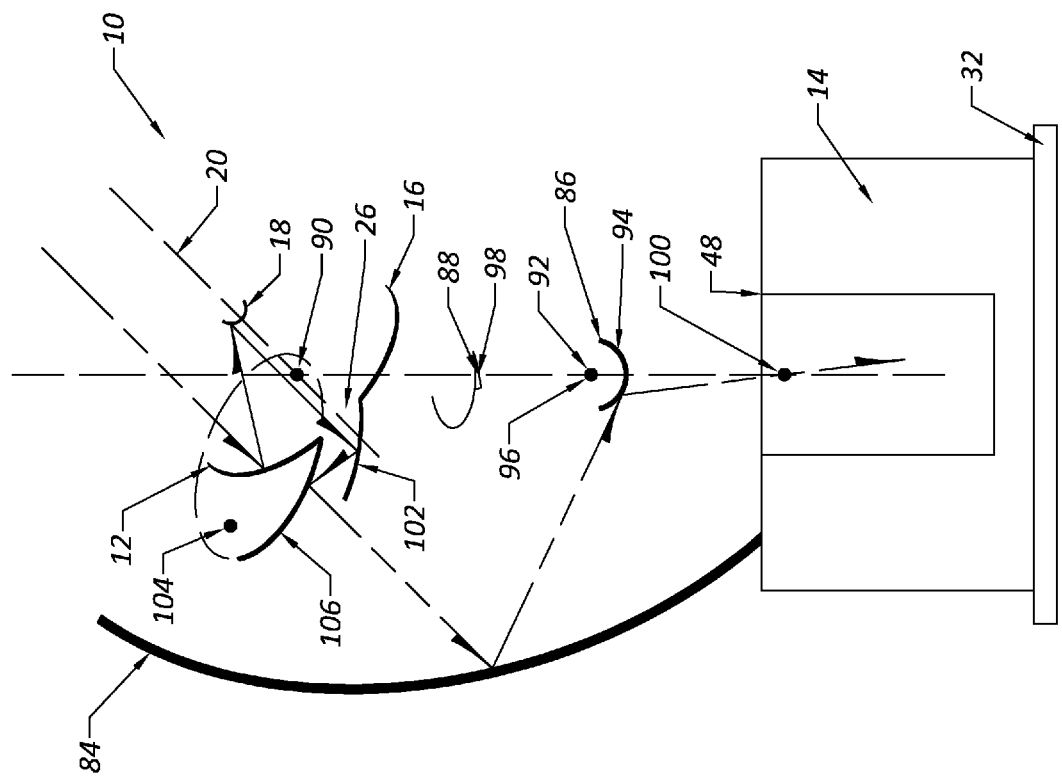

APPARATUS FOR HARNESSING SOLAR ENERGY

BACKGROUND OF THE INVENTION

1. Field of the Invention

The present invention relates generally to the field of solar technology and relates to an apparatus for harnessing solar energy that enables heat generated from solar radiation to be used and stored for practical ends.

2. Description of the Related Art

Humans have long understood the benefits derived from harnessing solar energy. Indeed, solar technology is quickly gaining popularity and is rapidly evolving in an effort to meet ever growing energy demands at a time that many characterize as an energy and resource crisis. Given this, the importance of developing better solar technology becomes readily apparent.

Presently, there exist many devices and methods that enable solar energy to be harnessed for various useful applications such as heat and electrical generation. However, current solar technology is often limited to large scale applications and is oftentimes too expensive and/or inapplicable to the everyday needs of the average individual. Thus, while current devices and methods accomplish their respective purposes, there is a need for solar technology that is not only more accessible and cost effective, but also capable of being used in a broad array of applications that may be small or large in scope.

SUMMARY OF THE INVENTION

The present invention, further disclosed herein, relates to a novel apparatus for harnessing solar energy. As such, the general purpose of the present invention, which will be described subsequently in greater detail, is to provide a novel apparatus for harnessing solar energy that combines active and passive solar technology to enable a user to perform various energy related applications.

To accomplish this, the apparatus comprises a telescope reflector and a heat accumulator. The telescope reflector includes a first parabolic reflector and a second parabolic reflector. The first parabolic reflector is arranged to receive solar radiation and the second parabolic reflector is arranged to project the solar radiation as a collimated beam, to be received by the heat accumulator. Optionally, various other reflectors may be used to create different pathways for the collimated beam, thus enabling the telescope reflector and the heat accumulator to take on several additional embodiments.

Regardless of embodiment, the heat accumulator includes at least one photo lock, a heating chamber and at least one fluid container in thermal communication with the heat accumulator. When the photo lock(s) is opened, the collimated beam may be received by the heating chamber, wherein heat is generated and transferred to a first fluid container to enable the fluid contained within to accumulate heat. At a desired temperature, the contents may be delivered to an outside source such as a thermodynamic machine for various uses, and then returned to the fluid container to be reheated. Depending on the needs of the user, the size of the fluid container(s) may vary. For instance, smaller fluid containers will be able to accumulate heat more quickly and provide heated fluid at rapid intervals at the expense of storage capacity. On the other hand, larger fluid containers will require more time to accumulate heat, but will be able to store more quantities of heated fluid and provide a more continuous supply of heated fluid once the desired temperature has been reached.

Taken this into account, a second fluid container may optionally be used to enable greater flexibility in a user's heating needs. For example, the second fluid container may be coupled to the first fluid container, wherein the second fluid container is arranged to receive fluid being returned by an outside source and to also refill the first fluid container as needed. Furthermore, the first fluid container and the second fluid container may be constructed to enable controlled heat exchange between the two fluid containers. As a result of this arrangement, the first fluid container may be constructed to accumulate heat and deliver heated fluid at higher rates while the second fluid container may be constructed to store a larger quantity of heatable fluid to be supplied to the first fluid container. In the event that heated fluid is not immediately needed, the photo lock(s) may remain temporarily open to allow the fluid contained within the first fluid container and, if preferred, the second fluid container, to reach a desired temperature before closing the photo lock(s). Alternatively, the photo lock(s) may be immediately closed to prevent heat from escaping the heat accumulator. In addition, closing the photo lock(s) prevents the collimated beam from entering the heating chamber and thus protects the heat accumulator from being damaged through overheating. No matter the reason, once the photo lock(s) is in a closed position, any heated fluid contained within the heat accumulator may be stored for later use.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

These together with other objects of the invention, along with the various features of novelty, which characterize the invention, are pointed out with particularity in the claims annexed to and forming a part of this disclosure. For a better understanding of the invention and its operating advantages, reference should be made to the accompanying drawings and descriptive matter in which there are illustrated embodiments of the invention.

BRIEF DESCRIPTION OF THE DRAWINGS

These and other features, aspects and advantages of the present invention will become better understood with reference to the following description, appended claims and accompanying drawings, in which:

FIG. 7 is a side vide of an alternate embodiment of the instant apparatus for harnessing solar energy.

DETAILED DESCRIPTION OF THE PREFERRED EMBODIMENTS

The present invention exhibits an apparatus, which enables individuals to generate and retain solar energy from solar radiation. The instant invention utilizes an optical system to focus solar radiation into a solar radiation receiving and thermal storage unit wherein solar energy is generated and harnessed for various applications or stored for later use.

Figure 1:
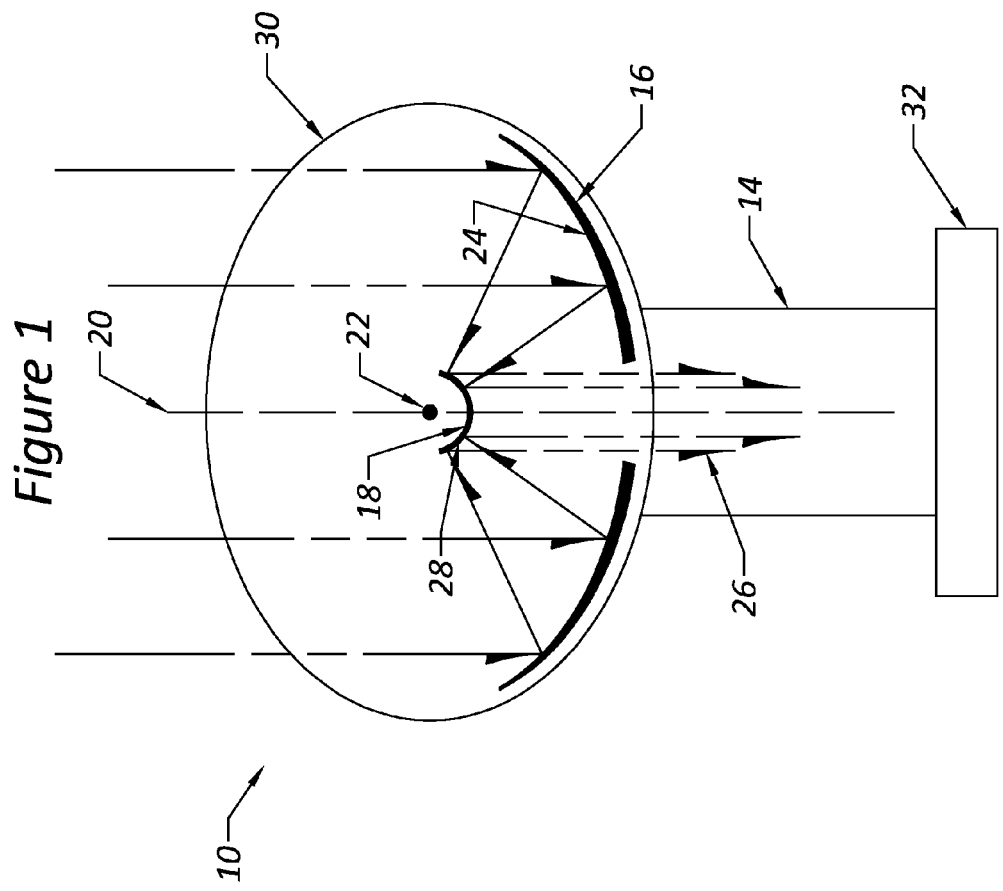
FIG. 1 is a side view of one embodiment of the instant apparatus for harnessing solar energy.

FIG. 1 illustrates one embodiment of the apparatus for harnessing solar energy 10 that includes a telescope reflector 12 coupled to a heat accumulator 14. In the instant embodiment and in subsequent embodiments, the telescope reflector 12 includes a primary parabolic reflector 16 and a secondary parabolic reflector 18, wherein the secondary parabolic reflector 18 is smaller than the primary parabolic reflector 16. In addition, the primary parabolic reflector 16 and the secondary parabolic reflector 18 are aligned to face in the same direction and to have an identical central telescopic axis 20 and focal point 22, wherein the secondary parabolic reflector 18 is located between the primary parabolic reflector 16 and the mutually shared focal point 22.

The primary parabolic reflector includes a reflective concave surface 24 disposed to reflect planar waves as spherical waves that converge towards the focal point 22 and also has a central opening 26. The secondary parabolic reflector 18 includes a reflective convex surface 28 disposed to receive the spherical waves before said spherical waves can converge at the focal point 22 and subsequently reflect said spherical waves as a collimated beam through the central opening 26 of the primary parabolic reflector 16. As illustrated, the telescope reflector 12 may be fixedly mounted to the heat accumulator 14 to enable the collimated beam to project downwards towards the heat accumulator 14. Given the construction of the telescope reflector 12, it should become obvious that the collimated beam is powerful and potentially dangerous. Thus, protective measures should be taken to prevent outer objects from contacting the collimated beam, such as, but not limited to, encasing the telescope reflector 12 within a light permeable shell 30. As such measures are generally well known in the art, further discussion is not needed and will not be provided herein. Finally, the heat accumulator 14 may be coupled to an outside source, such as a thermodynamic machine 32, which is well known in the art and will not be further described herein. With respect to the instant embodiment, it may be preferable to stack the heat accumulator 14 on top of the thermodynamic machine 32 as such an arrangement may be beneficial as a result of the telescope reflector 12 providing a shaded area in which to position all or portions of the heat accumulator 14 and/or the thermodynamic machine 32, thereby enabling the user to shield selected portions from exposure to solar radiation.

Figure 2:
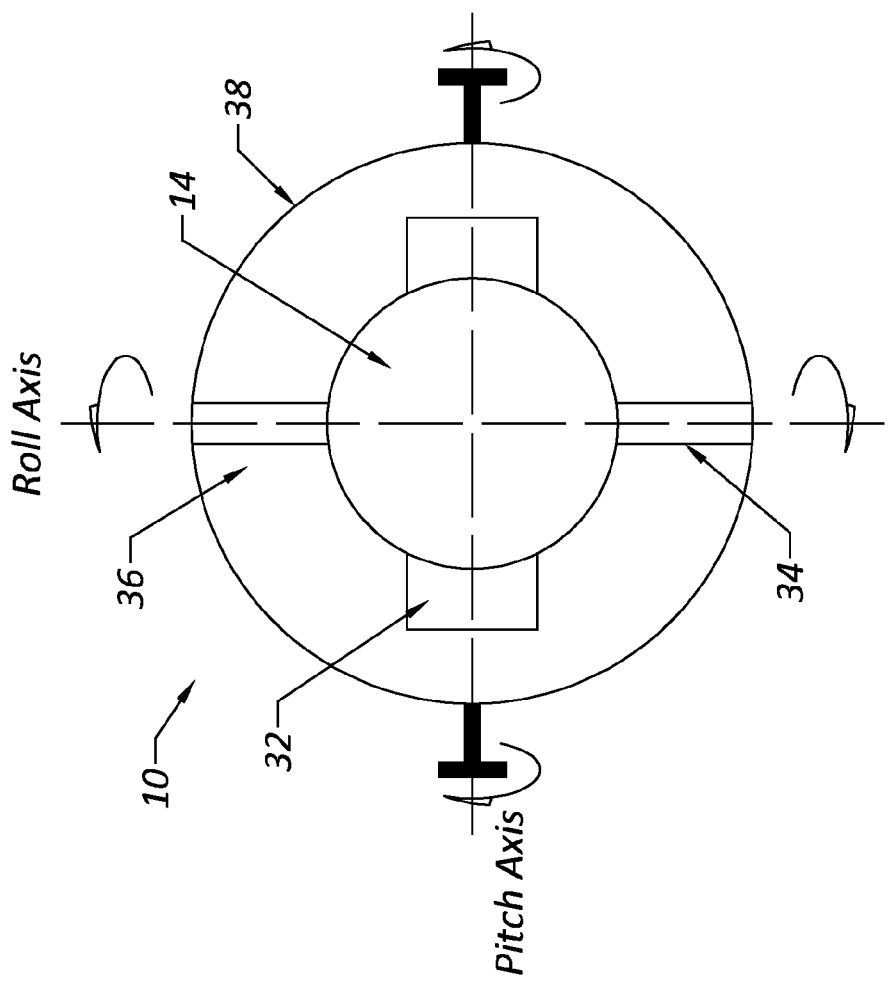
FIG. 2 is a top view of the embodiment illustrated in FIG. 1, wherein the apparatus may be pivotable through the use of pivots and a gimbal.

FIG. 2 illustrates a top view of the embodiment shown in FIG. 1, having omitted the telescope reflector for clarity, wherein the apparatus 10 is constructed to be pivotable on any axis in three-dimensional space. In the instant embodiment, a first pivot 34 is secured to any side of the heat accumulator 14 and a second pivot 36 is secured to the corresponding opposite side. Also, the first pivot 34 and the second pivot 36 are each secured to a gimbal 38 wherein the pivots are disposed to enable the apparatus 10 to rotate around either the roll axis or the pitch axis depending on which sides of the heat accumulator 14 are chosen. For exemplary purposes, if the roll axis is desired for pivot rotation, then the gimbal 38 may be disposed to enable the apparatus and pivot assembly to independently and/or simultaneously pivot around the pitch axis and the opposite holds true should the pitch axis be selected for rotation of the first pivot 34 and the second pivot 36. Thus, the axial arrangement between the pivots and the gimbal 38 are interchangeable and in addition, the gimbal 38 can be constructed to pivot around the yaw axis if so desired. However, rotation around the yaw axis may result in unwanted interference as portions of the gimbal 38 may partially block solar radiation. In any event, the apparatus 10 can be readily positioned to receive solar radiation as plane waves despite the changing location of the sun. Thus, in light of the above, one advantage of the apparatus described in the foregoing embodiment is the ability to be mounted on a stationary object or a moving object.

Figure 3:
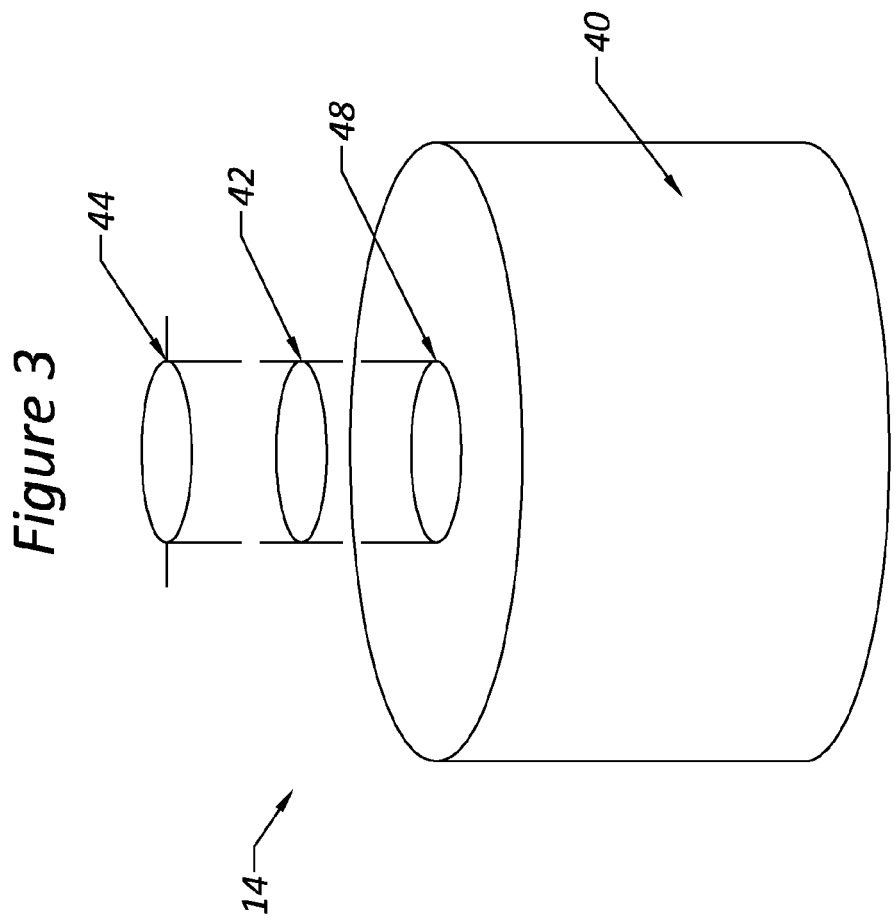
FIG. 3 is an exploded view of the quartz glass and photo lock.

FIG. 3 illustrates one embodiment of the heat accumulator 14 that is capable of being used in the above and all subsequently described embodiments of the apparatus for harnessing solar radiation 10, which includes a housing 40 disposed to receive a glass quartz 42 and at least one photo lock 44. In the instant embodiment, the housing 40 is cylindrical in shape and has a top end 46 with a central opening 48 disposed to receive the collimated beam. Fitted to the opening 48 is a circular quartz glass 42 or any other light-permeable object that is highly durable and resilient to heat and pressure. A photo lock 44 is mounted externally on top of the quartz glass 42 and is capable of being opened and closed. In the instant embodiment, the photo lock 44 includes an adjustable aperture that is circular in shape and is capable of contracting and expanding. Additionally, the photo lock 44 is constructed to have a mirrored surface on the topside and the underside. Therefore, when the photo lock 44 is fully contracted, the mirrored underside prevents heat from leaving the receptacle and the mirrored topside prevents overheating by reflecting the collimated beam back through the reflective pathway where it eventually leaves the system as sunlight. While only one photo lock 44 is necessary, a plurality may be used as safeguards in the event one malfunctions.

Figure 4:
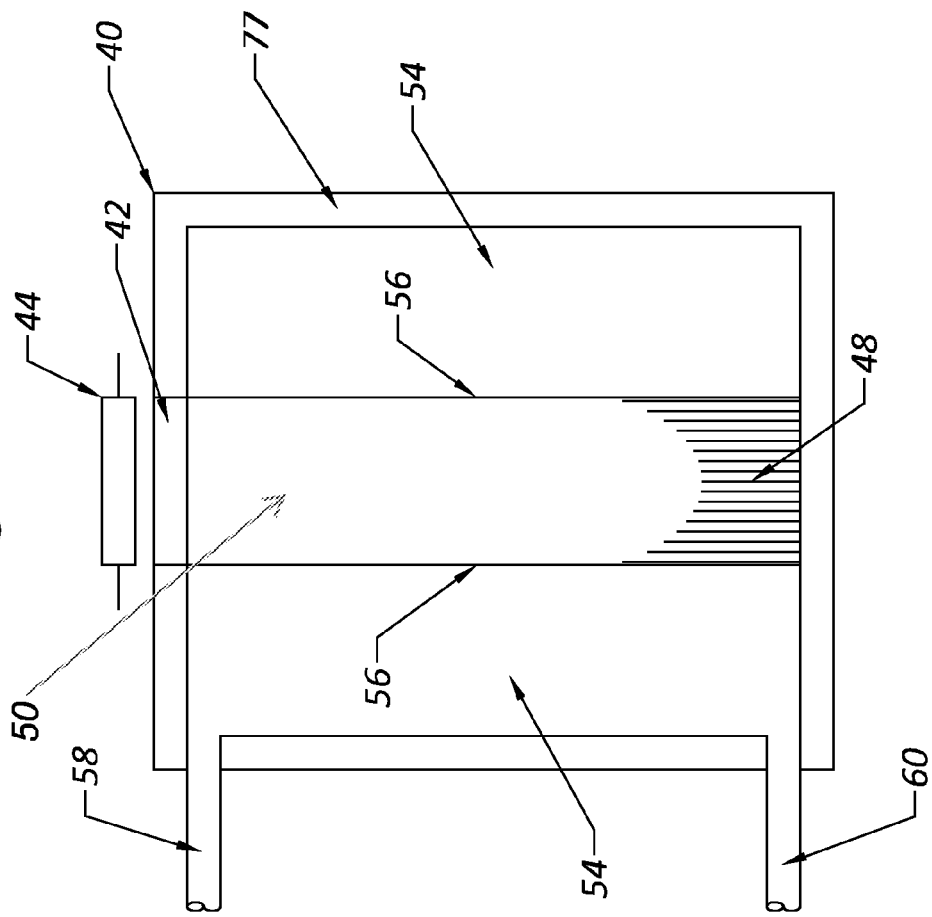
FIG. 4 is a cross sectional internal view of one embodiment of the heat accumulator.

FIG. 4 illustrates one internal embodiment of the housing 40 having internal components that includes a heating chamber 50, at least one fluid container, and a means to expel and receive fluid. In the instant embodiment, the heating chamber 50 is cylindrical in shape having an open top end that engages the quartz glass 42, thereby creating a vacuum inside the heating chamber 50. Also, the heating chamber 50 further includes a heat emitting material 52, disposed to receive the collimated beam. In the instant embodiment, the heat emitting material 52 is arranged in a rod-like array. A first fluid container 54 is arranged to be in thermal communication with the heating chamber 50, wherein the first fluid container 54 has a closed cylindrical annular shape and is disposed to receive the heating chamber 50 within the empty cylindrical center enclosed by the inner annular wall 56 of the fluid container. Additionally, the first fluid container 54 is capable of being filled with water or any other readily heatable fluid and includes an outlet shaft 58 to enable fluid to be expelled from the first fluid container 54 and an inlet shaft 60 to enable fluid to return to the first fluid container 54. As previously mentioned, the size of the fluid container(s) will determine how quickly fluid can accumulate heat and be used as well as storage capacity.

Figure 5:
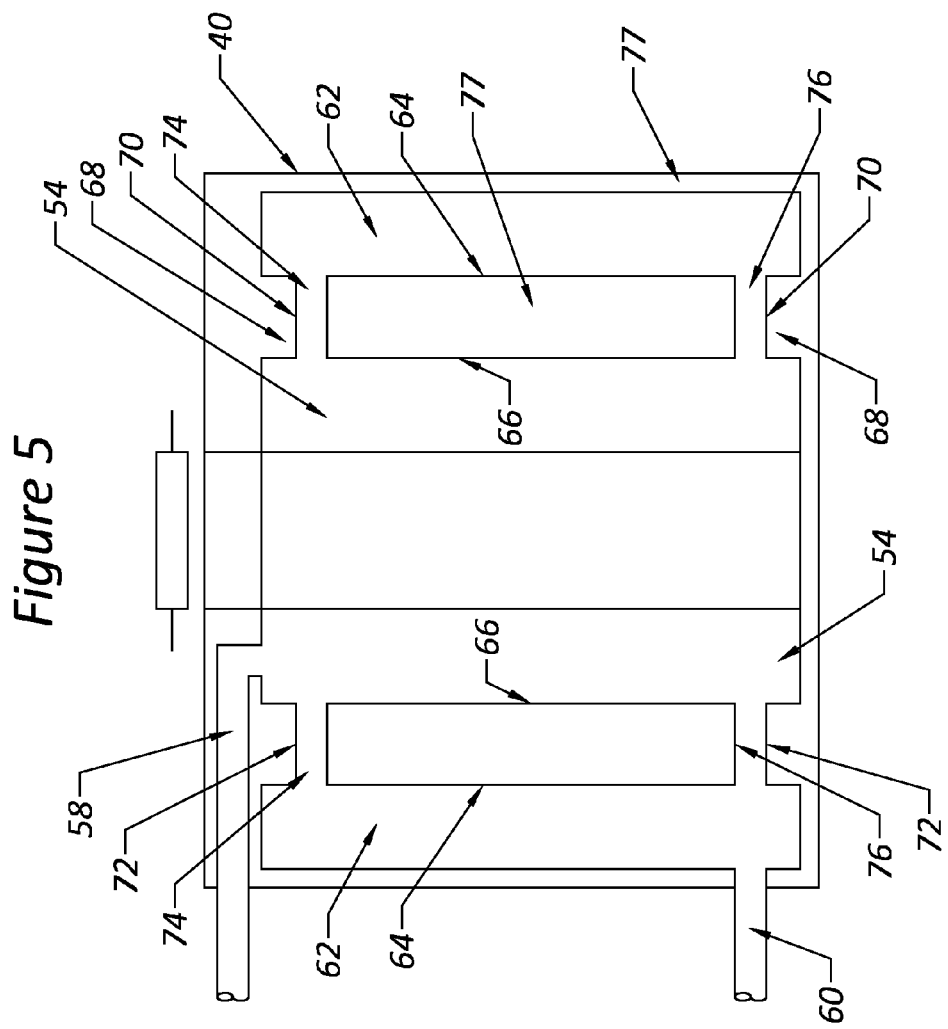
FIG. 5 is a cross sectional internal view of an alternate embodiment of the heat accumulator.

Optionally, the internal housing 40 may also include a second fluid container 62 in communication with the first fluid container 54 as shown in FIG. 5. In that embodiment, the second fluid container 62 has a closed cylindrical annular shape and is disposed to receive the first fluid container 54 within the center space enclosed by the inner annular wall 64 of the second fluid container, wherein the outer annular wall 66 of the first fluid container 54 is connected to the inner annular wall 64 of the second fluid container 62 by at least one pair of connecting shafts 68 to enable the fluid within the first fluid container 54 to communicate with the fluid within the second fluid container. In this way, heat transfer may occur between the first fluid container 54 and the second fluid container 62. While only one pair of connecting shafts 68 is necessary, using more enables greater fluid contact.

In the instant embodiment, a first pair of connecting shafts 70 and a second pair of connecting shafts 72 are oppositely arranged wherein each pair of connecting shafts includes an upper shaft 74 that is horizontally aligned and disposed to connect an upper portion of the outer annular wall 66 of the first fluid container 54 to a corresponding upper portion of the inner annular wall 64 of the second fluid container 62. Also included is a lower shaft 76 that is horizontally aligned and disposed to connect a lower portion of the outer annular wall 66 of the first fluid container 54 to a corresponding lower portion of the inner annular wall 64 of the second fluid container 62, wherein each upper shaft 74 and each lower shaft 76 share the same vertical plane. Optionally, each pair of connecting shafts may be permanently open to always allow fluid contact or constructed to be capable of regulating fluid contact between the first fluid container 54 and the second fluid container 62. Lastly, instead of being coupled to the first fluid container 54, as seen in FIG. 4, the inlet shaft 60 is coupled to the second fluid container 62.

In either embodiment, it is preferable to construct the internal components from a material that can withstand high temperatures such as, but not limited to tungsten due to the large quantities of heat capable of being generated by the collimated beam. Moreover, since the collimated beam is extremely powerful, it is important to construct the heat emitting material 52 found within the heating chamber 50 from a material that readily absorbs solar radiation and subsequently emits heat, such as, but not limited to ceramic. In this way, heat may be safely generated and the collimated beam is prevented from leaving the heating chamber. Lastly, the internal components may be secured to the housing 40 using any materials and methods known in the art to prevent heat transfer. For instance, the inner components may be secured to the housing 40 by a securing mechanism comprising a material with little or no heat conductivity. Furthermore, a vacuum may be created in the remaining space between the internal components and the housing and if applicable, between the first fluid container 54 and the second fluid container 62, wherein the surfaces of the housing 40 and internal components within the vacuum are mirrored to further guard against unwanted heat transfer. In this manner, very little heat, if any, should reach the walls and ends of the housing 40, and therefore, the housing may be constructed from any desired material.

Thus, given the above described embodiments, when the photo lock(s) 44 is open, the collimated beam enters the heating chamber 50 through the quartz glass 42 and contacts the heat emitting material 52, wherein the heat emitted is transferred between the heat chamber 50 and the first fluid container 54 and eventually heats up the fluid contained within the first fluid container 54. If the heat accumulator has only one fluid container, as described in the embodiment shown in FIG. 4, the fluid may be expelled through the outlet shaft 58 once the fluid inside the fluid container has accumulated enough heat and received by an external source, such as a thermodynamic machine, where the high temperature fluid may be used for various applications before being returned to the fluid container from the inlet shaft 60. For the purposes of expelling and returning fluid, several means already exist, such as, but not limited to, the use of a pump.

Alternatively, if the heat accumulator 14 has two fluid containers, as described in the embodiment shown in FIG. 5, heated fluid may be expelled from the first fluid container 54 and the fluid within the second fluid container 62 may simultaneously accumulate heat through convection if there is fluid contact between the first fluid container 54 and the second fluid container 62. Once the heated fluid has been expelled, the first fluid container 54 may be refilled by withdrawing fluid from the second fluid container 62. If fluid within the second fluid container 62 was accumulating heat, the fluid being supplied to the first fluid container 54 may require less time to reach the desired temperature before being able to be expelled from the first fluid container 54. The second fluid container 62 may subsequently be refilled by the fluid being returned through the inlet shaft 60. In either embodiment, if immediate use is not required, the photo lock(s) 44 may remain open to enable the fluid to accumulate more heat and then contracted to store the heated fluid for later use. Alternatively, the photo lock(s) 44 may be immediately contracted at the request of the user or once a predetermined temperature threshold is met to prevent heat loss and/or to protect against overheating. Consequently the remaining heated fluid can be temporarily stored for later use or expelled for cooling purposes.

Figure 6:
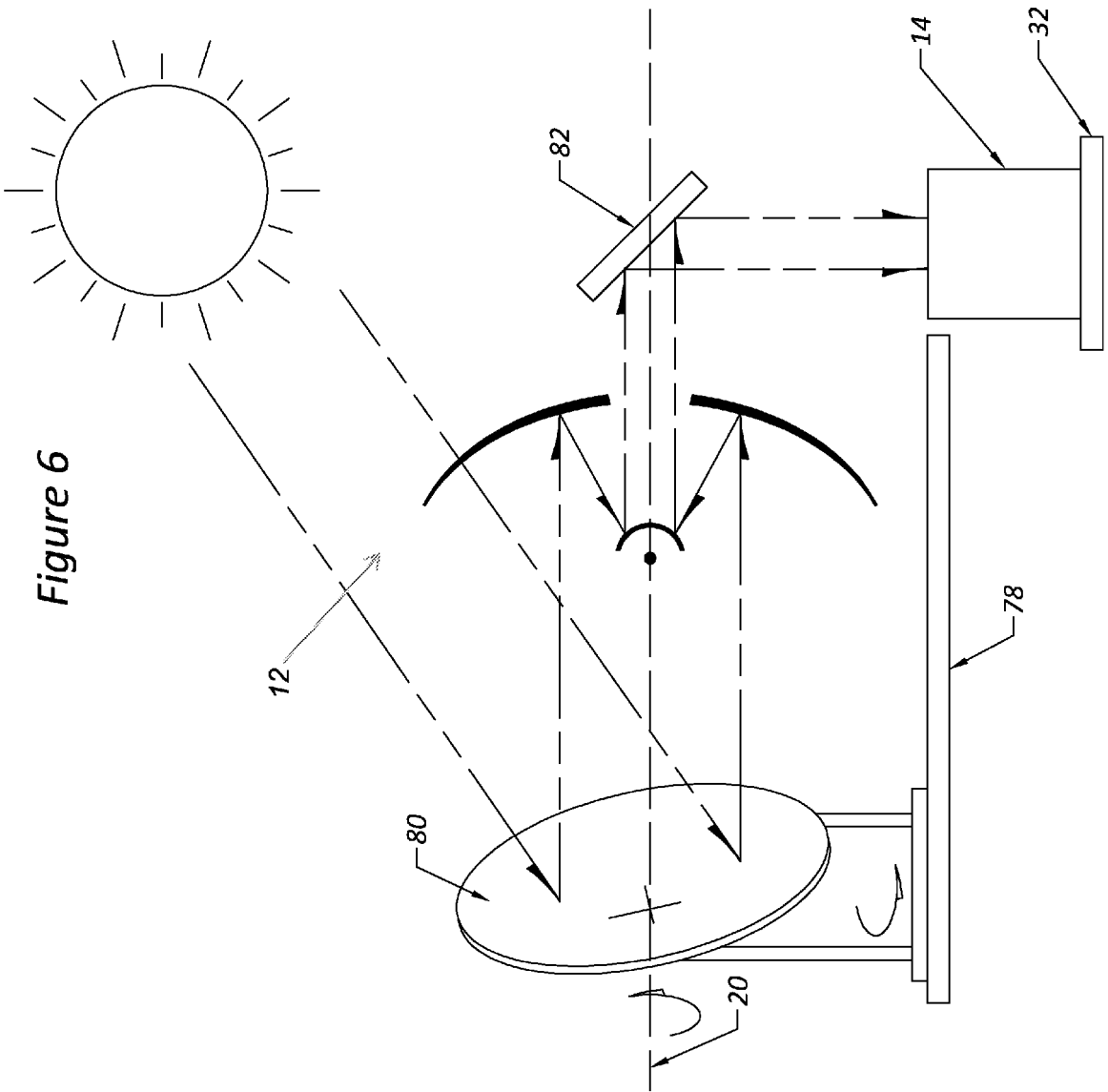
FIG. 6 is a side view of an alternate embodiment of the instant apparatus for harnessing solar energy.

FIG. 6 illustrates another embodiment of the heat generating and retaining apparatus 10 having an optic platform 78 that includes a telescope reflector 12 disposed between a planar reflector 80 and at least one angular reflector 82. The telescope reflector 12 is mounted to the optic platform 78, and is disposed to receive plane waves from the planar reflector 80 and to project a collimated beam towards the angular reflector 82, which in turn reflects the collimated beam towards the heat accumulator 14, which may be coupled to a thermodynamic machine 32. Optionally, a user may utilize more angular reflectors to allow for greater flexibility in the placement of the heat accumulator 14. In the instant embodiment, the heat accumulator 14 is disposed below the angular reflector 82 and is positioned underground to illustrate how the instant embodiment enables the heat accumulator 14 to be secured in a safe manner should the collimated beam exit the confines of the heat accumulator 14.

To enable the telescope reflector 12 to receive solar radiation as a planar wave, the central telescopic axis 20 of the telescope reflector 12 is directed towards the center of the planar reflector 80. In addition, the planar reflector 80 is disposed to be rotatable around its vertical axis and its central horizontal axis. In this arrangement, if the optic platform 78 is disposed in a north-south arrangement, the planar reflector 80 can be adjusted to the sun's changing position as the sun rises from the east and sets in the west due to the Earth's rotation. To accomplish this, several methods already exist in the art and therefore will not be discussed in great detail. These methods may include, but are not limited to, the use of tracking systems such as GPS. In any event, regardless of the method used, the planar reflector 80 is the only required moving component and all other components may be fixedly mounted, thereby providing greater structural integrity. As previously noted, protective measures should be taken to prevent outer objects from contacting the collimated beam.

FIG. 7 illustrates yet another embodiment of heat generating and retaining apparatus 10, which includes an elliptical reflector 84, a telescope reflector 12, and a variable reflector 86. As shown, the elliptical reflector 84 comprises a halved portion of an ellipse that is divided along the major axis 88. In addition, the elliptical reflector 84 is mounted to the heat accumulator 14 to have its major axis 88 vertically aligned with the central opening 48 of the heat accumulator 14 and is disposed to be rotatable around its major axis 88. The telescope reflector 12 is coupled to the elliptical reflector 84 and rotatably disposed to receive solar radiation directly from the sun. One way to accomplish this is to arrange the telescope reflector 12 within a gimbal, wherein the rotational center point is the upper focus 90 of the elliptical reflector 84 and where the upper focus 90 of the elliptical reflector 84 is located on the central telescopic axis 20 of the telescope reflector 12 at a location between the primary parabolic reflector 16 and the secondary parabolic reflector 18. In this manner, the telescope reflector 12 will always project a collimated beam through the upper focus 90 of the elliptical reflector, which, by nature, will deflect the collimated beam towards the lower focus 92 of the elliptical reflector 84 to be received by the variable reflector 86 prior to reaching the lower focus and 92 deflected downwards through the central opening 48 of the heat accumulator 14.

In the instant embodiment, the variable reflector 86 is mounted to the elliptical reflector 84 and comprises the upper arm of a north-south opening hyperbolic reflector 94 having an upper focus 96 located at the same position as the lower focus 92 of the elliptical reflector 84, wherein the transverse axis 98 of the hyperbolic reflector 94 is vertically aligned with the central opening 48 of the heat accumulator 14 and superimposed on the major axis 88 of the elliptical reflector 84. In addition, the lower arm of the hyperbolic reflector is omitted to allow the collimated beam to pass through the lower focus 100 of the hyperbolic reflector 94, which may be positioned at a desired location within the heat accumulator 14 by extending the transverse axis 98 of the hyperbolic reflector 94.

Given the above description, a potential problem arises when the sun is directly above the reflector telescope 12. In this instance, the telescope reflector 12 will be unable to project the beam towards the elliptical reflector 84 and as a result, may damage objects in its reflective pathway, such as the variable reflector 86. To prevent this from happening, it is necessary to create a different reflective pathway as the collimated beam goes through the central opening 26 of the primary parabolic reflector 16. One pathway includes securing a third parabolic 102 reflector to the central opening 26 of the primary parabolic reflector 16. Additionally, the third parabolic reflector 102 is disposed to have its reflective surface facing the elliptical reflector 84 and a focal point 104 located between the elliptical reflector 84 and the third parabolic reflector 102. Also, a segmented elliptical reflector 106 is secured to the underside of the primary parabolic reflector 16, wherein the segmented elliptical reflector 106 shares the same focal points as the upper focus 90 of the elliptical reflector and the focal point 104 of the third parabolic reflector 102 and corresponds to an outer reflective portion of an ellipse that is disposed along the pathway of the collimated beam being reflected by the third parabolic reflector 102 towards the focus shared by the third parabolic reflector 102 and the segmented elliptical reflector 106. In this arrangement, the segmented elliptical reflector 106 deflects the collimated beam back onto its original reflective path towards the elliptical reflector 84 and the variable reflector 86. Since the third parabolic reflector 102 and the segmented elliptical reflector 106 are secured to the primary parabolic reflector 16, the telescope reflector 12 may be rotatable without compromising the desired reflective pathway of the collimated beam.

Optionally, other types of reflectors may be used to reflect the collimated beam towards the heat accumulator 14 and/or for flexibility in the placement of the heat accumulator. Like in previous embodiments, the heat accumulator 14 may be coupled to a thermodynamic machine 32 and protective measures should be in place to shield the collimated beam from harmful contact. Thus, from the disclosure of the instant embodiment, it will become obvious to those skilled in the art that the apparatus 10 described herein may be used on a moving object or a stationary object and the heat accumulator 14 may be safely concealed if so desired.

The instant invention can easily be constructed with current tooling technology. While the foregoing has mentioned several materials that may be used to construct the instant invention, they should not be viewed as all inclusive. Rather, it is to be known that the materials provided herein are merely examples of suitable components and there will invariably exist other materials suitable to safely constructing the instant invention as the principles of thermodynamics and optics are longstanding in their respective scientific fields, and as such, those skilled in the art are well aware of the means available to them.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the heat generating and retaining apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus for harnessing solar energy comprising:
    a reflector comprising a primary parabolic reflector in communication with a secondary parabolic reflector;
    a heat accumulator comprising:
        a housing comprising an opening, a quartz glass fitted to said opening, and at least one photo lock coupled to said quartz glass;
        a heating chamber disposed within said housing, wherein said heating chamber is in communication with said quartz glass;
        at least one fluid container disposed within said housing, wherein said at least one fluid container is in communication with said heating chamber;
        a fluid delivery component in communication with said at least one fluid container;
        a fluid receiving component in communication with said at least one fluid container;
    a pivoting mechanism;
    a protective mechanism;
    wherein said primary parabolic reflector and said secondary parabolic reflector both have a same focus and a same central axis, wherein said secondary parabolic reflector is smaller than said primary parabolic reflector and is located between said primary parabolic reflector and said focus;
    wherein said primary parabolic reflector further comprises a central opening and is disposed to receive and focus solar radiation towards said focal point;

wherein said secondary parabolic reflector is disposed to receive solar radiation being focused from said first parabolic reflector prior to reaching said focus and to project focused solar radiation as a collimated beam through the central opening of said first parabolic reflector towards said heat accumulator;

wherein said housing is substantially cylindrical and comprises a second central opening aligned with the central opening of the primary parabolic reflector;

wherein said at least one photo lock comprises an adjustable aperture capable of expanding and contracting, wherein said adjustable aperture further comprises a mirrored topside and a mirrored underside;

wherein said heating chamber comprises a substantially cylindrical structure having an open top end that engages the quartz glass to create a vacuum within said heating chamber; and wherein said heating chamber further comprises a heat emitting material in a rod-like array that is disposed to receive the collimated beam.

2. The apparatus for harnessing solar energy of claim 1, wherein said at least one fluid container comprises a first fluid container having a cylindrical annular structure and is disposed to receive said heating chamber within the empty cylindrical center enclosed by the inner annular wall of said first fluid container, wherein said heating chamber and said first fluid container are in thermal communication.

3. The apparatus for harnessing solar energy of claim 2, wherein said fluid delivery component comprises an outlet shaft coupled to said at least one fluid container and said fluid receiving component comprises an inlet shaft coupled to said at least one fluid container.

4. The apparatus for harnessing solar energy of claim 3, wherein the remaining space within said housing comprises a mirrored vacuum.

5. The apparatus for harnessing solar energy of claim 4, wherein the pivoting mechanism comprises a first pivot and a second pivot secured to said heat accumulator and rotatably disposed within a gimbal.

6. The apparatus for harnessing solar energy of claim 5, wherein the protective mechanism comprises a light-permeable enclosure containing said reflector.

7. The apparatus for harnessing solar energy of claim 6, wherein said at least one fluid container comprises a plurality of fluid containers, wherein said plurality of fluid containers further comprises a first fluid container and a second fluid container both enclosed within said housing.

8. The apparatus for harnessing solar energy of claim 7, wherein said second fluid container has a closed cylindrical annular shape and is disposed to receive the first fluid container within the center space enclosed by the inner annular wall of the second fluid container, wherein the outer annular wall of the first fluid container is connected to the inner annular wall of the second fluid container by at least one pair of connecting shafts.

9. The apparatus for harnessing solar energy of claim 8, wherein said fluid delivery component comprises an outlet shaft coupled to said first fluid container and said fluid receiving component comprises an inlet shaft coupled to said second fluid container.

* * * * *